: 2,856,292

Patented Oct. 14, 1958

2,856,292

PRESERVATION OF HONEY

Socrates Agaesilovos Kaloyereas, Baton Rouge, La., assignor to Research Corporation, New York, N. Y., a corporation of New York No Drawing. Application July 17, 1957
Serial No. 672,345

8 Claims. (Cl. 99—146)

This invention relates to a method of preserving honey by preventing the crystallization of the sugars contained therein and to the new stable honey compositions thereby produced.

Despite the common belief to the contrary, honey is a perishable product. In a two-year storage experiment the yearly loss of honey was found to average 13 percent. Crystallization is the first step in honey deterioration which may be followed by fermentation.

Honey consists mainly of a mixture of three sugars: levulose 40.5 percent, dextrose 34.0 percent, and sucrose 1.9 percent, all dissolved in water, the amount of which averages 17.7 percent. Honey also contains some other substances, such as dextrines, gums, organic acids, proteins, coloring substances, aldehydes, esters, superior alcohols, rare sugars, and enzymes.

Dextrose, the most easily crystallizable of the three sugars, is the first to form crystals when crystallization occurs. Since dextrose hydrate crystals contain only 9.09 percent of water, when partial crystallization occurs the remaining liquid honey is diluted, and thus offers a better medium for the growth of the osmophilic yeast that is always present in honey.

I have now found that the addition to honey of aliphatic monocarboxylic acids, preferably within the range of 4 to six carbon atoms, for example, sorbic acid (2,4-hexdienoic acid) and isobutyric acid, in the amount of from about 0.01% to about 0.5% by weight of the honey, effectively prevents the crystallization of honey over long periods of time.

The crystallization inhibiting acids may be mixed with the honey, preferably immediately after extraction from the comb, or they may be mixed with the honey biologically by feeding bees with sugar solutions containing the inhibiting acids.

In general, about 0.3% of the inhibiting acid by weight of the honey is effective in preventing crystallization under normal storage conditions. The amount of acid may be substantially reduced if the acid is added to the honey promptly after extraction.

The effectiveness of the inhibiting acids may be increased by subjecting the honey to quick freezing conditions and thereafter storing the honey at −40° F.

The effectiveness of the inhibiting acids and the keeping qualities of the honey may also be substantially enhanced by subjecting the treated honey to the action of ultrasonic vibrations. The ultrasonic wave action has the effect of destroying yeast organisms present in the honey and of bringing about an improved dispersion of the inhibiting acid in the honey.

For example, a honey to which 0.1% of sorbic acid has been added may be subjected to the action of a magnetostriction oscillator at 9 kilocycles per second for about 30 minutes.

In introducing the inhibiting acids by biological action, sucrose or levulose solutions containing, for example, about 50% of the sugar and from about 0.2 to about 2% of sorbic or butyric acid are made available to the base.

In general, acids of higher molecular weight, such as sorbic acid, are preferable to the lower molecular weight acids because of their lesser odor.

I claim:

1. A method of preserving honey which comprises incorporating in the honey a crystallization inhibiting amount of an aliphatic monocarboxylic acid containing from 4 to 6 carbon atoms.

2. A method of preserving honey which comprises incorporating in the honey a crystallization inhibiting amount of an aliphatic monocarboxylic acid containing from 4 to 6 carbon atoms by feeding honey-producing bees with a sugar solution containing from about 0.2% to about 2% of said acid.

3. A method of preserving honey which comprises incorporating in the honey from about 0.01 to about 0.5% of sorbic acid.

4. A method of preserving honey which comprises incorporating in the honey from about 0.01 to about 0.5% of isobutyric acid.

5. A method of preserving honey which comprises incorporating in the honey a crystallization inhibiting amount of an aliphatic monocarboxylic acid containing from 4 to 6 carbon atoms and thereafter subjecting the honey to the action of ultrasonic vibrations.

6. A storage stable honey having incorporated therein a crystallization inhibiting amount of an aliphatic monocarboxylic acid containing from 4 to 6 carbon atoms.

7. A storage stable honey having incorporated therein from about 0.01% to about 0.5% of sorbic acid.

8. A storage stable honey having incorporated therein from about 0.01% to about 0.5% of isobutyric acid.

References Cited in the file of this patent

UNITED STATES PATENTS

| | | |
|---|---|---|
| 2,379,294 | Gooding | June 26, 1945 |
| 2,474,227 | Coleman et al. | June 28, 1949 |
| 2,585,103 | Fitzgerald | Feb. 12, 1952 |

OTHER REFERENCES

Borden's Review of Nutrition Research, vol. IX, No. 5, May 1948, page 12.